(12) United States Patent
Nakai et al.

(10) Patent No.: US 8,035,864 B2
(45) Date of Patent: Oct. 11, 2011

(54) IMAGE PROCESSING APPARATUS

(75) Inventors: Yoshiyuki Nakai, Nara (JP); Yohichi Shimazawa, Nara (JP); Koichi Sumida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1056 days.

(21) Appl. No.: 11/901,779

(22) Filed: Sep. 19, 2007

(65) Prior Publication Data

US 2008/0252937 A1 Oct. 16, 2008

(30) Foreign Application Priority Data

Sep. 19, 2006 (JP) ................................. 2006-252370

(51) Int. Cl.
*H04N 1/04* (2006.01)
(52) U.S. Cl. ......... 358/448; 358/474; 358/496; 358/497
(58) Field of Classification Search .................. 358/448, 358/474, 496, 497, 498

See application file for complete search history.

(56) References Cited

U.S. PATENT DOCUMENTS 6,801,636 B2 * 10/2004 Murakami et al. ............ 382/100

FOREIGN PATENT DOCUMENTS

| JP | 07-327132 | 12/1995 |
|---|---|---|
| JP | 2001-094771 | 4/2001 |
| JP | 2003-280469 | 10/2003 |

* cited by examiner

*Primary Examiner* — Houshang Safaipour
(74) *Attorney, Agent, or Firm* — David G. Conlin; Steven M. Jensen; Edwards Angell Palmer & Dodge LLP

(57) ABSTRACT

Depending on processing to be executed, the processing is prevented from being restricted even if a particular image is included in image data. There is provided an image processing apparatus comprising an authentication section 67 which distinguishes a user; a particular-image judgment section 63 which detects particular images from inputted image data and judges whether or not the number of the particular images exceeds a threshold; and a threshold determination section 66 which determines a threshold according to the user and processing to be executed; and a control section 7 which restricts the processing to be executed when the number of the particular images exceeds the threshold. Depending on the importance degree of the security of the processing to be executed, the threshold determination section 66 lowers the threshold as the importance degree is higher and raises the threshold as the importance degree is lower. Furthermore, the threshold is raised in the case of a registered user and lowered in the case of an unregistered user.

9 Claims, 4 Drawing Sheets

IMAGE PROCESSING APPARATUS

BACKGROUND OF THE INVENTION

1. Field of the Invention

The present invention relates to an image processing apparatus which restricts processing such as copying, facsimile communication and data transmission on the basis of a particular image added to image data.

2. Description of the Related Art

In an image processing apparatus, processing for inputting image data and outputting the image data by copying, facsimile communication or data transmission is executed. When a particular image is included in the image data, the executed processing is restricted. Thereby, wrongful use of the inputted image data can be prevented.

In Japanese Patent Laid-Open No. 2001-94771, for each kind of image data such as copy data, facsimile data and printer data, a threshold for identifying a particular image, such as that of paper money and securities, is set. When it is detected that a particular image is included in inputted image data, printing of the image data is inhibited.

In Japanese Patent Laid-Open No. 2001-94771 described above, the threshold is variable so that a particular image is securely detected. In this case, examples of restriction of processing due to a particular image include inhibition of copying, data transmission and facsimile communication, and inhibition of filing to a storage section. When a particular image is detected in inputted image data, the processing is securely restricted.

However, there may be a case where, when a particular image is detected, it is more preferable to continue execution of the processing than restricting the processing, depending on the processing to be executed. For example, in the case of transmitting a great number of documents by facsimile, the processing to be executed is stopped when particular images exceeding a threshold is detected. In the case of performing facsimile communication processing, it is not possible to wrongfully use a document outputted from a facsimile apparatus which has received the document. In this case, it is convenient that the processing is continued even if a particular image is detected. The processing can be continued by changing the threshold.

Accordingly, in consideration of the above situation, the object of the present invention is to provide an image processing apparatus which can be easily used by a user by preventing processing from being restricted even if a particular image is included in image data, depending on the processing to be executed.

SUMMARY OF THE INVENTION

The present invention is provided with: a processing section which processes inputted image data; a judgment section which detects particular images from the inputted image data and judges whether or not the particular images exceed a reference level; and a control section which restricts processing to be executed when the particular images exceed the reference level; and the control section determines whether or not to perform restriction on the basis of a reference level which differs depending on the processing to be executed.

Among processings to be executed, there are some processings the execution of which does not have to be strictly restricted even if a particular image is included. Such processings can be prevented from being restricted when a particular image is detected, by raising the reference level. Thereby, unnecessary interruption time is prevented from occurring. Accordingly, the processing can be smoothly executed, and the processing efficiency is improved. By lowering the reference level, the processing is restricted even if only few particular images are detected.

A reference level determination section which determines the reference level lowers the reference level as the importance degree is higher and raises the reference level as the importance degree is lower, depending on the importance degree of the security of the processing to be executed. The reference level determination section lowers the reference level in the case of inputting image data by reading an image in comparison with the case of directly inputting the image data. The importance degree of reading an image is considered to be higher than that of directly inputting image data.

As for such processing that the execution thereof does not have to be strictly restricted, the importance degree is assumed to be low, and the reference level is raised. Therefore, even if a particular image is detected due to misdetection, it is possible to prevent the processing from being immediately restricted and continue the processing.

There is provided a user distinguishing section which distinguishes a user, and the control section sets a different reference level according to the user. The reference level is determined not only by the processing to be executed but also by the user. The processing can be restricted more closely, and the security can be improved.

The reference level determination section lowers the reference level when the user is a guest who is not registered in comparison with the case where the user is a registered user. Since the reference level is lowered when an unregistered guest is a user, the processing can be strictly restricted. Therefore, wrongful use by a third person can be prevented.

The processing section performs each processing of copying, data transmission, facsimile communication and filing. The importance degree is higher in ascending order of facsimile communication, copying, filing and data transmission. Accordingly, the reference level determination section lowers the reference level in descending order of facsimile communication, copying, filing and data transmission. The reference level is assumed to be the number of particular images, and the number of particular images is set to be small in the case of lowering the reference level and set to be large in the case of raising the reference level.

According to the present invention, in the case where it is convenient to continue processing even if a particular image is detected, restrictions on such processing can be reduced. Accordingly, the processing is executed without being stopped, and the convenience for a user is improved. Furthermore, since more strict restriction can be performed, depending on the processing to be executed, it is possible to prevent wrongful use and leakage of image data.

DETAILED DESCRIPTION OF THE PREFERRED EMBODIMENTS

Figure 1:
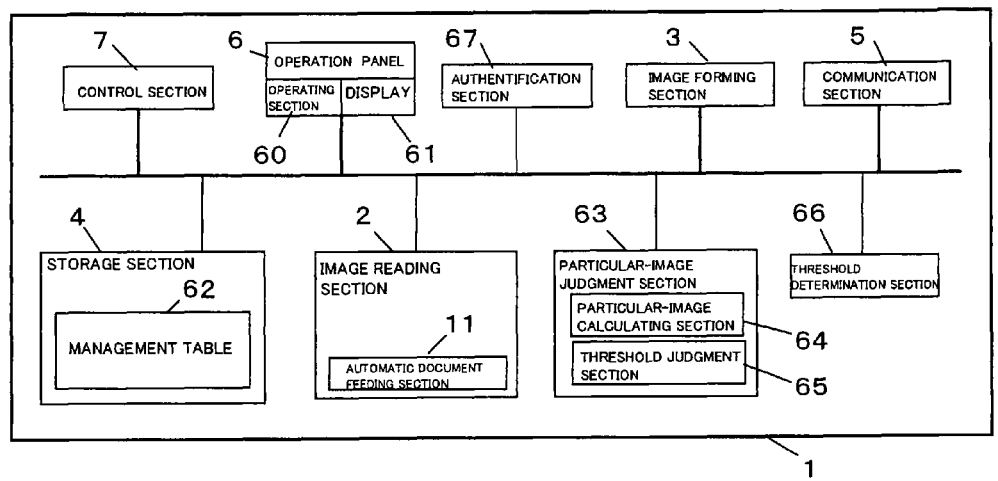
FIG. 1 is a control block diagram of an image processing apparatus of the present invention.

An image processing apparatus of this embodiment is shown in FIG. 1. This image processing apparatus is a complex machine which executes a copy mode, a print mode, a scanner mode and a facsimile mode, and it is provided with an image reading section 2 for reading a document and inputting image data, an image forming section 3 for processing and printing the image data, a storage section 4 for storing the image data, a communication section 5 for communicating with external apparatuses, an operation panel 6 for performing an input operation and a control section 7 for controlling a processing section to execute image data processing corresponding to the mode, in a cabinet 1. The processing section is for performing processing of the inputted image data to output the image data and includes the image forming section 3, the storage section 4 and the communication section 5.

Figure 2:
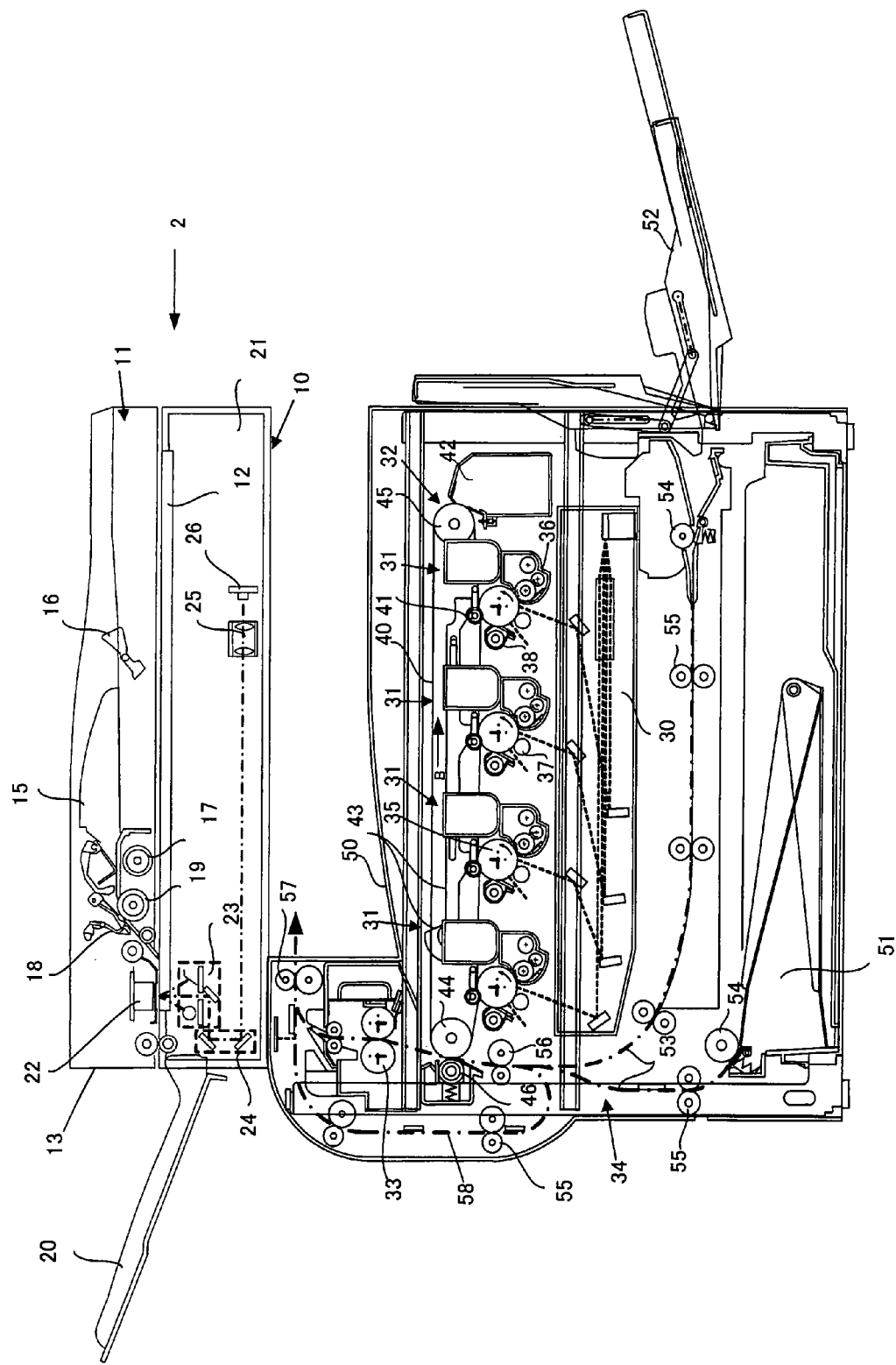
FIG. 2 is a diagram showing the schematic whole configuration of the image processing apparatus.

As shown in FIG. 2, the image reading section 2 is arranged at the upper part of the cabinet 1, and it is provided with a scanner section 10 and an automatic document feeding section 11. The automatic document feeding section 11 is arranged above the scanner section 10, and it automatically feeds a document to read the image data of the document.

A document table 12 made of platen glass is provided over the top surface of the cabinet 1, and a document cover 13 which covers the document table 12 is also provided. The automatic document feeding section 11 is mounted in a manner that it is integrated with the document cover 13. The document cover 13 can be freely opened and closed, and a document is fed by the automatic document feeding section 11 when the document cover 13 is closed. A document can be placed on the document table 12 when the document cover 13 is opened. Opening and closing of the document cover 13 is detected by a cover opening/closing sensor. There is also provided a document size detection sensor for detecting the size of a document placed on the document table 12.

When a document is set on a document setting tray 15 of the automatic document feeding section 11, a document detection sensor 16 detects that the document has been set. Then, copying conditions such as the size of the sheet to be printed and the changed magnification are inputted on the operation panel 6. After that, reading of the image of the document is started by an input operation of a start key.

In the automatic document feeding section 11, the documents on the document setting tray 15 are pulled out by a pickup roller 17 one by one. Each document passes between a stacking plate 18 and a feeding roller 19, and is delivered to the document table 12. The document is fed on the document table 12 in a vertical scanning direction and discharged to a document discharge tray 20. The document discharge tray 20 is provided with a document discharge sensor to detect whether or not there is a document on the document discharge tray 20.

The scanner section 10 is provided with first and second reading sections 21 and 22. A reading area is formed on one side of the document table 12. When a document is fed on the document table 12, the document passes through the reading area. Below the reading area, a first scanning unit 23 of the first reading section 21 is positioned to read the surface (the underside surface) of the document.

When the document is fed to the document table 12 by the automatic document feeding section 11, the first scanning unit 23 is moved to the reading position and positioned there, and a second scanning unit 24 is also positioned at a predetermined position. The surface of the document is illuminated by the exposure lamp of the first scanning unit 23 from below the document table 12. The light reflected from the document is lead to an image forming lens 25 by the reflection mirrors of the first and second scanning units 23 and 24. The light reflected from the document is condensed to a CCD 26 by the image forming lens 25. The image on the surface of the document is formed on the CCD 26. Thereby, the image on the surface of the fed document is read.

Furthermore, the back side (the upper-side surface) of the document is read by the second reading section 22. The second reading section 22 is arranged above the document table 12, and it is provided with LEDs for illuminating the back side of the document, an exposure lamp array having fluorescent lamps or the like, a selfoc lens array for condensing the light reflected from the document, for each pixel, a contact image sensor (CIS) for performing optical/electrical conversion of the light reflected from the document, which has been received through the selfoc lens array, to output an analog image signal, and the like. The image on the back side of the fed document is read thereby.

When a document is placed on the document table 12, the image on the surface of the document is read by the first reading section 21. The first and second scanning units 23 and 24 move in the vertical scanning direction while mutually keeping a predetermined speed relationship. The document on the document table 12 is exposed by the first scanning unit 23, and the light reflected from the document is lead to the image forming lens 25 by the first and second scanning units 23 and 24. The image on the document is formed on the CCD 26 by the image forming lens 25.

When the image on one side or both sides of the document is read in this way, the image data of one side or both sides of the document is inputted to the control section 7. The control section 7 has an image data processing section, and various image processings are performed for the image data by the image data processing section. This image data is outputted to the image forming section 3.

The image forming section 3 prints a color image or a black-and-white image on a sheet on the basis of the inputted image data. The image forming section 3 is provided with a laser scanning unit 30, four image stations 31, an intermediate transfer belt unit 32, a fixing apparatus 33 and a feeding apparatus 34.

The image stations 31 form color images corresponding to the colors of black, cyan, magenta and yellow, respectively. Each image station 31 is provided with a photoreceptor drum 35, a development apparatus 36, a charging apparatus 37, a cleaning apparatus 38 and a neutralization apparatus (not shown).

The photoreceptor drum 35 is rotary-driven in one direction. The cleaning apparatus 38 cleans toner remaining on the surface of the photoreceptor drum 35. The neutralization apparatus removes electricity from the surface of the photoreceptor drum 35. The charging apparatus 37 uniformly charges the surface of the photoreceptor drum 35.

The laser scanning unit 30 modulates a laser beam on the basis of image data inputted from the image reading section or the like, and repeatedly scans the surface of the photoreceptor drum 35 in the horizontal scanning direction by this laser beam to form an electrostatic latent image on the surface of the photoreceptor drum 35. The development apparatus 36 provides toner for the surface of the photoreceptor drum 35, develops the electrostatic latent image and forms a toner image on the surface of the photoreceptor drum 35.

The intermediate transfer belt unit 32 is provided with an intermediate transfer belt 40, an intermediate transfer roller 41, an intermediate belt cleaning apparatus 42 and a tension mechanism 43. The intermediate transfer belt 40 is arranged above each photoreceptor drum 35. It is wound around a driving roller 44 and a driven roller 45 and rotates in the direction of an arrow B.

The intermediate transfer roller 41 is arranged opposite to the photoreceptor drum 35 with the intermediate transfer belt 40 between them, and transfer bias voltage is applied thereto. By voltage with the polarity opposite to that of the voltage of the toner being applied by the intermediate transfer roller 41, the toner image on the surface of the photoreceptor drum 35 is transferred to the intermediate transfer belt 40. Toner images of the respective colors are laminated on the intermediate transfer belt 40, and a synthesized multicolor toner image is formed.

The intermediate transfer rollers 41 are arranged in a manner that they are pressed against the intermediate transfer belt 40, and voltage with the polarity opposite to that of the voltage of the toner is applied thereto. The toner image on the intermediate transfer belt 40 is transferred to a sheet fed into between a transfer roller 46 and the intermediate transfer belt 40, by the transfer roller 46. The toner remaining on the intermediate transfer belt 40 is removed by the intermediate belt cleaning apparatus 42.

The toner image transferred to the sheet is fixed on the sheet by being heated and pressurized by the fixing apparatus 33, and an image is formed on the sheet. The sheet on which the image is printed in this way is discharged to a discharge tray 50 provided at an upper part of the cabinet 1.

The feeding apparatus 34 feeds a sheet along a feeding path 53 from a sheet cassette 51 or a manual tray 52. The feeding path 53 passes between the intermediate transfer belt 40 and the transfer roller 46, passes through the fixing apparatus 33, and reaches the discharge tray 50.

The feeding apparatus 34 is provided with pickup rollers 54, feeding rollers 55, a resist roller 56 and a discharge roller 57. Sheets in the sheet cassette 51 or the manual tray 52 are delivered to the feeding path 53 one by one, fed along the feeding path 53, and discharged to the discharge tray 50. While the sheets are fed, an image is printed thereon. A switchback feeding path 58 is also provided to enable both-side printing. The sheet for which fixation has been performed is caused to travel through the switchback feeding path 58 by the feeding rollers 55 and fed into between the intermediate transfer belt 40 and the transfer roller 46. The both-side printed sheet passes through the fixing apparatus 33 and is discharged to the discharge tray 50.

The operation panel 6 is provided for the scanner section 10, and it has an operating section 60 and a display 61. The operating section 60 is provided with various operation keys. The display 61 is configured by a liquid crystal display, and it is a touch panel. Touch keys are formed within an operation screen displayed on the display 61, and these keys also function as operation keys.

The communication section 5 is provided with a communication interface, and the communication interface is connected to a network such as a LAN and a WAN. Multiple external apparatuses are connected to the network. The external apparatuses include other image processing apparatuses, information processing apparatuses such as a personal computer, and servers. The network is connected to the Internet from a router via a telephone line, a communication line such as an optical fiber communication line, or the like. The communication section 5 can communicate with the external apparatuses via the network, with the use of a predetermined communication protocol. The image processing apparatuses can also communicate with one another. Communication within the network can be performed wiredly and wirelessly. An image processing system is formed by these image processing apparatuses and external apparatuses.

The communication section 5 is also provided with a modem apparatus. A telephone line is connected to the modem apparatus. The image processing apparatus can perform facsimile communication. The image processing apparatus can also perform data communication by Internet facsimile via the network. Furthermore, the communication section 5 is provided with a communication terminal and a communication card for wireless communication. A storage medium such as a USB memory and an IC card is connected to the communication terminal, and the communication section 5 sends and receives data to and from the storage medium. The communication section 5 also sends and receives data to and from a communication terminal such as a mobile phone and a PDA via wireless communication, through the communication card.

The storage section 4 is configured by a hard disk drive. The storage section 4 stores image data inputted from the image reading section 2 or image data inputted from the communication section 5. The inputted image data is once stored in an image memory such as a DRAM, and it is transferred to the storage section 4 from the image memory after image processing or encryption processing is performed therefor. When the image data is read from the storage section 4, image processing or decryption processing is performed therefor, and the image data is stored in the image memory. After that, the image data is outputted to the outside by printing, data transmission or facsimile communication in accordance with the executed processing.

The storage section 4 has a management table 62. In the management table 62, information required for causing the image processing apparatus to operate is stored, such as control information and setting information about the image processing apparatus, and authentication information about a user. When such information is created or changed, the information in the management table 62 is updated. The management table 62 may be provided in a non-volatile memory different from the storage section 4.

The control section 7 is configured by a micro computer having a CPU, a ROM and a RAM. The CPU reads a control program stored in the ROM out to the RAM and executes the control program. Each section operates in accordance with the control program. When image data is inputted, any mode among the print mode, the copy mode, the scanner mode and the facsimile mode is executed on the basis of processing conditions included in information inputted from the operating section 60 or header information of the image data inputted from an external apparatus. The control program includes a browser and mail software, and the control section 7 performs data communication with external apparatuses, and sends and receives e-mails to and from the external apparatuses with the use of a communication protocol such as the TCP/IP protocols.

When executing each mode, the control section 7 temporarily stores inputted image data in the storage section 4. The control section 7 also executes a filing mode for storing the inputted image data in the storage section 4 and managing it. The stored image data is re-outputted in accordance with instructed processing.

The outputted image data is deleted from the storage section 4 in response to an instruction from the control section 7. When performing this deletion, the image data is invalidated so that it cannot be restored, by overwriting random data on the image data. A security kit is mounted on the image processing apparatus to perform the invalidation processing and further perform encryption processing and decryption processing. By the security kit operating in response to an instruction from the control section 7, wrongful use of the image data can be prevented.

In order to prevent a confidential document from being wrongfully copied or facsimile-transmitted, a particular image is added to a document. The particular image is, for example, a character image such as "Copy inhibit" and "Strictly restricted", an image of a predetermined pattern, or an image of combination of characters and a pattern. The particular image indicates restriction information corresponding to processing to be executed, such as inhibition of copying, deterioration of printing quality, inhibition of data transmission and facsimile communication and inhibition of filing.

Figure 3:
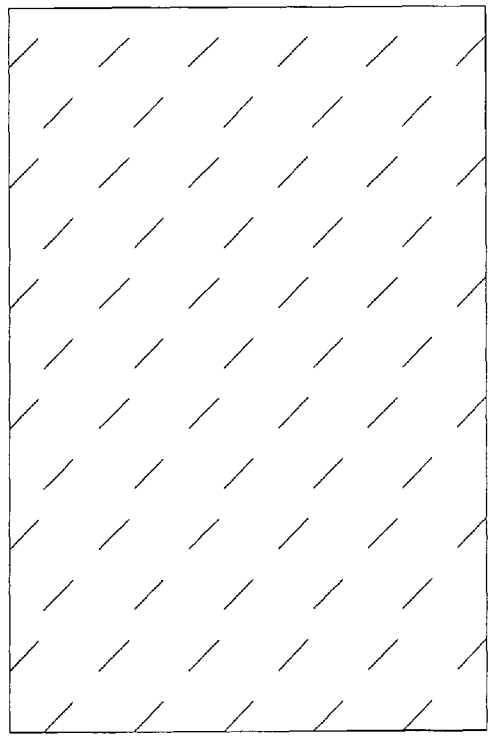
FIG. 3 is a diagram showing a document including particular images.

The control section 7 generates image data in which particular images are synthesized, and printing is performed on the basis of this image data. Thereby, a document including particular images, as shown in FIG. 3, is created. Particular images of the same form are regularly arranged, and one document page includes multiple particular images. The particular images on the document are difficult for a person to visually recognize. However, the particular images can be read by the image reading section 2.

Accordingly, there are provided a judgment section for detecting whether or not particular images are included in inputted image data and judging whether or not the particular images exceed a reference level, and a reference level determination section for determining the reference level. The image data is not limited to that inputted from the image reading section 2. It may be inputted from an external apparatus, a storage medium or a communication terminal through the communication section 5.

The operation of a particular-image judgment section 63 as the judgment section is controlled by the control section 7, and the particular-image judgment section 63 finds a particular image by performing pattern matching between the inputted image data and image data corresponding to the particular image. The image data corresponding to the particular image is registered in advance and stored in the management table 62. The particular-image judgment section 63 has a particular image calculation section 64 for calculating the number of the detected particular images and a threshold judgment section 65 for judging whether the detected particular images have exceeded a threshold. In the case of image data in pages, the particular image calculation section 64 calculates the number of particular images for each page. Alternatively, it calculates the number of particular images for in an area with a predetermined size. The threshold judgment section 65 judges whether the calculated number of particular images exceeds the threshold. This threshold is assumed to be a reference level. The threshold is set in advance and stored in the management table 62.

When particular images exceeding the threshold are included in inputted image data, the control section 7 restricts processing to be executed. That is, the control section 7 instructs inhibition of copying in the case of the copy mode and instructs inhibition of transmission in the case of the facsimile mode and the scanner mode. In the case of the filing mode, it instructs inhibition of storage of the image data into the storage section 4.

In this case, the control section 7 determines whether or not to restrict processing, with the use of a different threshold according to the processing to be executed. The processing is processing executed by the processing section, and it is copying, data transmission, facsimile communication or filing. As the reference level determination section, there is provided a threshold determination section 66 for determining a threshold corresponding to each processing.

The threshold determination section 66 determines the threshold according to the importance degree of the security of each processing. The importance degree of each processing is based on how image data is handled by the processing. That is, the importance degree of facsimile communication, copying, filing and data transmission increases is increasingly higher in that order. In facsimile communication, a document is owned by a user, and information about the facsimile communication is printed on the image printed at the transmission destination. Therefore, it cannot be used as an original document. Accordingly, the importance degree is considered to be extremely low. In copying, an original document is owned by a user. Accordingly, the importance degree is considered to be low. In filing, there is a possibility that stored image data may be taken out and used by a third person. Accordingly, the importance degree is considered to be medium. In data communication, it cannot be detected by a user at all how transmitted image data will be used. Therefore, the importance degree is considered to be high.

According to the importance degree of each processing, the threshold determination section 66 lowers the threshold as the importance degree is higher. That is, the threshold is lower and lower in the order of facsimile communication, copying, filing and data transmission.

Furthermore, the threshold determination section 66 determines the threshold according to users. In order to identify a user, an authentication section 67 is provided as a user distinguishing section for distinguishing a user. The authentication section 67 distinguishes a user on the basis of authentication information such as a password and biometric authentication information. The authentication information about a user is stored in the management table 62. The authentication section 67 confirms whether inputted authentication information is authentication information about a registered user. Then, it identifies a user level depending on whether the user has been authenticated or not. The user level of an authorized manager, among authenticated users, is assumed to be high, and the user level of an unauthorized general user is assumed to be medium. The user level of a guest who is an unauthenticated user is assumed to be low. The higher the user level is, the higher the threshold determination section 66 raises the threshold. That is, the threshold is lower and lower in the order of manager, general user, and guest.

Figure 4:
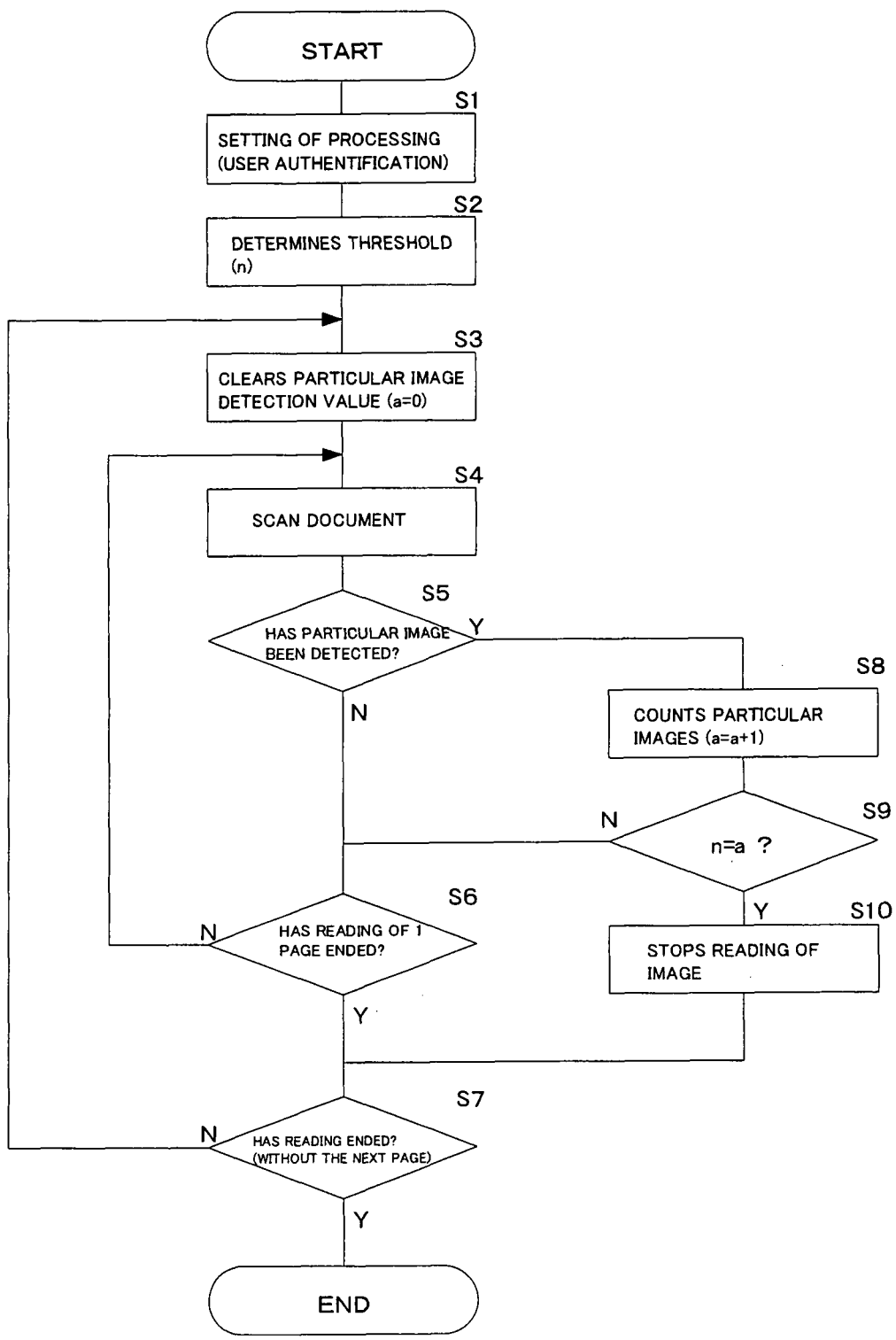
FIG. 4 is a flowchart for detecting particular images.
Figure 5:
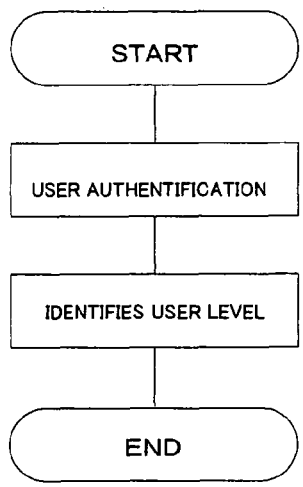
FIG. 5 is a flowchart for identifying a user.

Next, the operation of detecting particular images will be described with reference to FIG. 4. Here, a document is read, and image data is inputted. First, a user inputs authentication information from the operating section 60 (S1). In this case, the authentication section 67 confirms whether the inputted authentication information is registered authentication information. As a result of the confirmation, the user is known from the authentication information. The authentication section 67 identifies the user level on the basis of the user.

Figure 6:
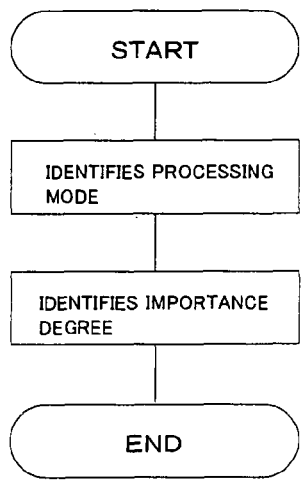
FIG. 6 is a flowchart for identifying processing to be executed.

The user operates the operation keys on the operation panel 6 to select processing to be executed. The control section 7 identifies the selected processing and identifies the importance degree of this processing, as shown in FIG. 6.

When the user and the processing to be executed are known, the threshold determination section 66 determines a threshold n on the basis of the user level and the importance degree of the processing (S2).

The reference threshold for each processing is set in advance according to the importance degree and stored in the management table 62. For example, n1 is set for facsimile communication, n2 for copying, n3 for filing, and n4 for data communication on the assumption of n1>n2>n3>n4. Next, the reference threshold is changed according to the user level. For example, in the case of a general user, the reference threshold is used as it is. In the case of a manager, (the reference value) +α is set, and in the case of a guest, (the reference value) −β is set, wherein α and β are arbitrary numbers. The threshold n is determined on the basis of the user and the processing to be executed, as described above.

The particular-image judgment section 63 clears a particular image detection value a (S3). The image reading section 2 scans the document and reads an image (S4). The particular-image judgment section 63 finds particular images in the image data inputted from the image reading section 2 (S5). If one document page is read (S6) and no particular image is detected, then the next document is read (S7).

When particular images are detected, the particular-image judgment section 63 counts the number of the particular images (S8). When the number of the particular images detected from one document page does not exceed the threshold n (S9), the next document is read (S7).

When the number of the detected particular images reaches the threshold n, the control section 7 restricts the processing to be executed. In this case, the control section 7 restricts the processing for this one document page. Accordingly, the image reading section 2 stops reading of the document (S10). After that, reading of the next document is continued.

When reading of all the documents ends, the processing instructed by the user is performed. In this case, the processing is restricted for the image data of such documents that the number of the particular images exceeds the threshold, and the processing is performed as usual for the image data of such documents that the number of the particular images does not exceed the threshold.

In the above description, processing is restricted for each page of multiple documents. However, processing may be restricted for the whole documents when particular images exceeding the threshold are detected in any one page of the documents.

In the case of performing facsimile communication, the threshold is the highest. Therefore, even if more particular images are detected, the possibility of the processing being restricted is lower in comparison with other processings. Thus, even in the case of misdetection of a particular image, facsimile communication is executed without being inhibited. Especially, it is possible to, in the case of transmitting a lot of documents, eliminate the trouble that the processing is stopped because reading is stopped before completion, and prevent a user from feeling the inconvenience.

Furthermore, by setting the threshold lower as the importance degree of security is higher, it is possible to determine whether or not the processing is to be restricted by detection of a particular image, and to restrict the processing quickly. Thereby, the risk of leakage of image data can be reduced. By determining a threshold according to users, the use by an unregistered guest can be restricted more in comparison with a registered user. Thereby, it is possible to securely prevent wrongful use by a third person.

The present invention is not limited to the embodiment described above, and a lot of modifications and changes can be made to the embodiment described above within the range of the present invention as a matter of fact. Though the threshold is determined according to the user and the processing to be executed in the embodiment described above, the threshold may be determined only according to the processing to be executed, irrespective of users. The reference level of particular images is not limited to the number of the particular images. It may be the amount of particular images or the rate of the area size of particular images in a predetermined area.

The processings to be executed includes the processing of inputting image data. When image data is inputted, two cases are conceivable: the case of reading an image by the image reading section and the case of directly inputting the image data from an external apparatus, a storage medium or a communication terminal through the communication section. It is assumed that a different threshold is used for each of the processings. The importance degree of the former is assumed to be higher than that of the latter. Therefore, a lower threshold is set for the former, and a higher threshold is set for the latter. When a confidential document is wrongfully used, image data is inputted by the image reading section. In the case of such use, since the threshold has been lowered, it is possible to quickly restrict the processing and securely prevent the wrongful use even if misdetection of a particular image occurs.

What is claimed is:

1. An image processing apparatus comprising:
a processing section which processes inputted image data;
a judgment section which detects particular images from the inputted image data and judges whether or not the particular images exceed a reference level; and
a control section which restricts processing to be executed when the particular images exceed the reference level; wherein
the control section determines whether or not to perform restriction on the basis of the reference level, which differs depending on an importance degree of a security of the processing to be executed.

2. The image processing apparatus according to claim 1, further comprising a reference level determination section which determines the reference level; wherein,
the reference level determination section lowers the reference level as the importance degree with respect to the security of the processing to be executed is higher and raises the reference level as the importance degree with respect to the security of the processing to be executed is lower.

3. The image processing apparatus according to claim 1, further comprising a reference level determination section which determines the reference level; wherein
the reference level determination section lowers the reference level in the case of inputting image data by reading an image in comparison with the case of directly inputting the image data.

4. The image processing apparatus according to claim 1, further comprising a user distinguishing section which distinguishes a user; wherein the control section sets a different reference level according to the user.

5. The image processing apparatus according to claim 4, wherein the reference level determination section lowers the reference level when the user is a guest who is not registered in comparison with the case where the user is a registered user.

6. An image processing apparatus comprising:
a processing section which processes inputted image data;
a judgment section which detects particular images from the inputted image data and judges whether or not the particular images exceed a reference level;
a user distinguishing section which distinguishes a user; and
a control section which restricts processing to be executed when the particular images exceed the reference level; wherein
the control section determines whether or not to perform restriction on the basis of the reference level, which differs depending on an importance degree of a security of the processing to be executed and the user.

7. The image processing apparatus according to claim 1, further comprising a reference level determination section which determines the reference level; wherein, depending on the importance degree of the security of the processing to be executed and the user, the reference level determination section lowers or raises the reference level.

8. The image processing apparatus according to claim 2 or 7, wherein the processing section performs each processing of copying, data transmission, facsimile communication and filing, and the reference level determination section lowers the reference level in descending order of facsimile communication, copying, filing and data transmission.

9. The image processing apparatus according to claim 8, wherein the reference level is assumed to be the number of particular images, and the number of particular images is set to be small in the case of lowering the reference level and set to be large in the case of raising the reference level.

* * * * *